(12) United States Patent
Wu et al.

(10) Patent No.: US 11,804,632 B2
(45) Date of Patent: Oct. 31, 2023

(54) ALUMINUM BATTERY PACKAGING FILM

(71) Applicant: APh ePower Co., Ltd., Kaohsiung (TW)

(72) Inventors: Jui-Hsuan Wu, Kaohsiung (TW); Shih Po Ta Tsai, Kaohsiung (TW); Chih-Cheng Tsai, Kaohsiung (TW)

(73) Assignee: APh ePower Co., Ltd., Kaohsiung (TW)

( * ) Notice: Subject to any disclaimer, the term of this patent is extended or adjusted under 35 U.S.C. 154(b) by 0 days.

(21) Appl. No.: 17/978,979

(22) Filed: Nov. 2, 2022

(65) Prior Publication Data

US 2023/0198062 A1 Jun. 22, 2023

(30) Foreign Application Priority Data

Dec. 16, 2021 (TW) .................... 110147295

(51) Int. Cl.
*H01M 50/129* (2021.01)
*H01M 50/119* (2021.01)
*H01M 50/193* (2021.01)
*B32B 7/12* (2006.01)
*B32B 15/088* (2006.01)
*B32B 15/09* (2006.01)
*B32B 15/20* (2006.01)
*B32B 27/28* (2006.01)

(52) U.S. Cl.
CPC ............ *H01M 50/129* (2021.01); *B32B 7/12* (2013.01); *B32B 15/088* (2013.01); *B32B 15/09* (2013.01); *B32B 15/20* (2013.01); *B32B 27/281* (2013.01); *H01M 50/119* (2021.01); *H01M 50/193* (2021.01); *B32B 2307/31* (2013.01); *B32B 2307/732* (2013.01); *B32B 2457/10* (2013.01)

(58) Field of Classification Search
CPC ............ H01M 50/129; H01M 50/119; H01M 50/193; B23B 7/12; B23B 15/088; B23B 15/09; B23B 15/20; B23B 27/281; B23B 2307/31; B23B 2307/732; B23B 2457/10
See application file for complete search history.

(56) References Cited

U.S. PATENT DOCUMENTS

2014/0234689 A1* 8/2014 Kim .................... B32B 7/12
429/120

FOREIGN PATENT DOCUMENTS

| CN | 103687721 | 3/2014 |
| CN | 210047167 | 2/2020 |
| EP | 2735441 | 5/2014 |

OTHER PUBLICATIONS

"Search Report of Europe Counterpart Application", dated May 8, 2023, p. 1-p. 7.

* cited by examiner

Primary Examiner — Jane J Rhee
(74) Attorney, Agent, or Firm — JCIPRNET

(57) ABSTRACT

An aluminum battery packaging film includes a heat-sealing layer, wherein a material of the heat-sealing layer includes modified polyethylene terephthalate, polycarbonate, polyimide, or a combination thereof.

9 Claims, 1 Drawing Sheet

ALUMINUM BATTERY PACKAGING FILM

CROSS-REFERENCE TO RELATED APPLICATION

This application claims the priority benefit of Taiwan application serial no. 110147295, filed on Dec. 16, 2021. The entirety of the above-mentioned patent application is hereby incorporated by reference herein and made a part of this specification.

BACKGROUND

Technical Field

The disclosure relates to a packaging film, and particularly relates to an aluminum battery packaging film.

Description of Related Art

Compared with other batteries (e.g. lithium batteries), aluminum batteries have more stringent requirements for packaging films. Furthermore, due to the composition of aluminum battery, the heat-sealing layer is easily dissolved by electrolyte corrosion within a short period of time, which leads to breakage and leakage of aluminum battery and affects the safety and lifetime of aluminum battery. Therefore, it is a challenge to design an aluminum battery packaging film that enhances the safety and lifetime of aluminum batteries.

SUMMARY

The disclosure provides an aluminum battery packaging film that enhances the safety and lifetime of aluminum batteries.

The aluminum battery packaging film of the disclosure includes a heat-sealing layer. A material of the heat-sealing layer includes modified polyethylene terephthalate, polycarbonate, polyimide, or a combination thereof.

In an embodiment of the disclosure, the modified polyethylene terephthalate is formed by modifying a crystalline form and a non-crystalline form by co-extrusion.

In an embodiment of the disclosure, a mechanical strength of the heat-sealing layer is at least greater than 3 kilogram force.

In an embodiment of the disclosure, the thickness of the heat-sealing layer is 25 micrometers (μm) to 150 micrometers.

In an embodiment of the disclosure, the aluminum battery packaging film is configured to package an aluminum battery including an acid electrolyte.

In an embodiment of the disclosure, a material of the heat-sealing layer does not include polypropylene.

In an embodiment of the disclosure, a first adhesive layer, a metal layer, a second adhesive layer, and a polymer material layer are stacked on the heat-sealing layer in sequence.

In an embodiment of the disclosure, a material of the metal layer is aluminum, and a material of the polymer material layer is nylon or polyethylene terephthalate.

In an embodiment of the disclosure, the thickness of the polymer material layer is 10 micrometers to 40 micrometers.

In an embodiment of the disclosure, the thickness of the metal layer is 20 micrometers to 60 micrometers.

Based on the above, the aluminum battery packaging film of the disclosure makes the heat-sealing layer by selecting materials such as modified polyethylene terephthalate, polycarbonate, polyimide, or a combination thereof, which have corrosion-resistant characteristics. In this way, the problem of electrolyte corrosion of the heat-sealing layer of aluminum battery packaging film is improved, and the occurrence of breakage and leakage of aluminum battery is reduced, thereby enhancing the safety and lifetime of aluminum batteries.

In order to make the above-mentioned features and advantages of the disclosure comprehensible, embodiments accompanied with drawings are described in detail below.

DESCRIPTION OF THE EMBODIMENTS

In order to make the content of the disclosure easier to understand, the following specific embodiments are illustrated as examples of the actual implementation of the disclosure. For clear description, many practical details will be described together in the following description. However, it should be understood that these practical details should not be used to limit the disclosure. That is, in some embodiments of the disclosure, these practical details are optional.

Unless otherwise defined, all terms (including technical and scientific terms) used herein have the same meaning as that commonly understood by one of ordinary skill in the art to which this disclosure belongs.

It should be understood that, although the terms "first", "second", "third", or the like may be used herein to describe various elements, components, regions, layers, and/or portions, these elements, components, regions, and/or portions should not be limited by these terms. These terms are only used to distinguish one element, component, region, layer, or portion from another element, component, region, layer, or portion. Thus, "a first element," "component," "region," "layer," or "portion" discussed below may be referred to as a second element, component, region, layer, or portion without departing from the teachings herein.

Figure 1:
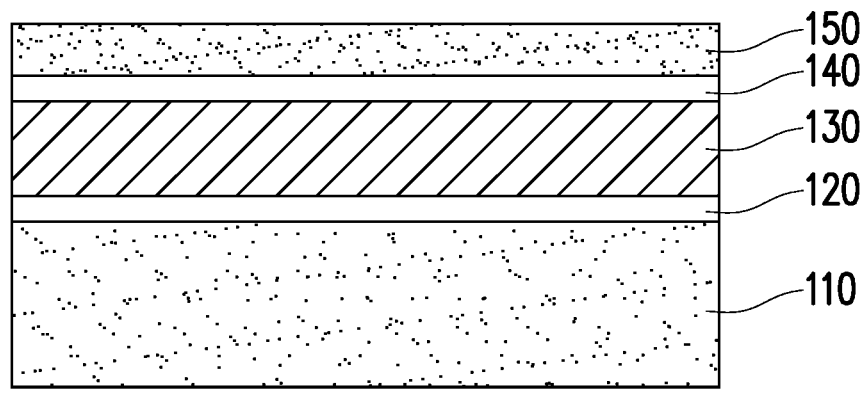
FIG. 1 is a partial cross-sectional schematic view of an aluminum battery packaging film according to an embodiment of the disclosure.
Figure 2:
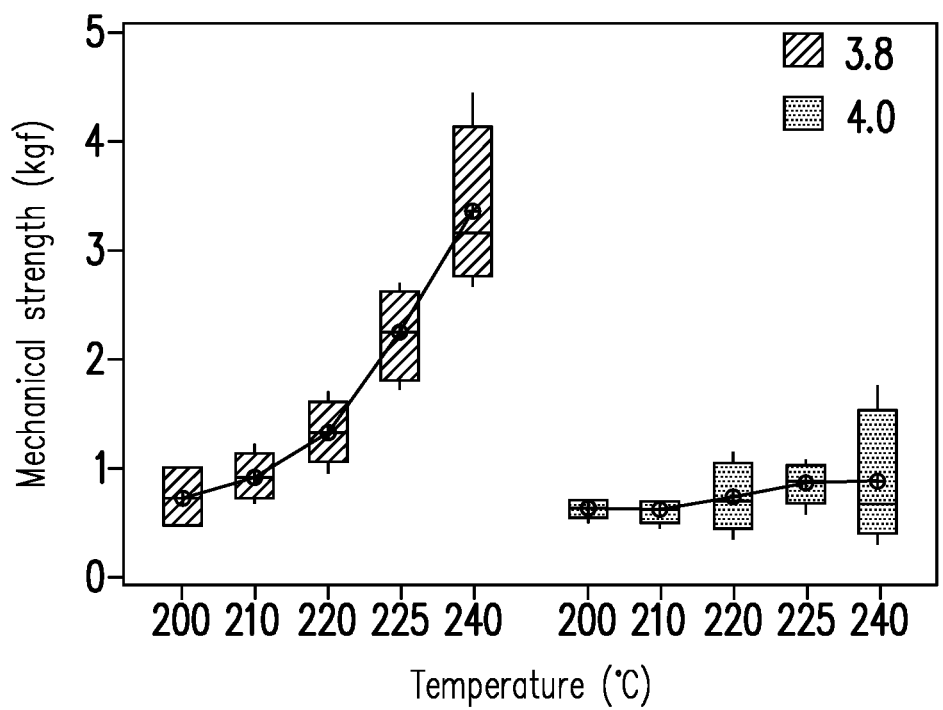
FIG. 2 is a schematic view illustrating the results of mechanical strength versus temperature of the heat-sealing layer of an aluminum battery packaging film at different speeds according to an embodiment of the disclosure.

FIG. 1 is a partial cross-sectional schematic view of an aluminum battery packaging film according to an embodiment of the disclosure. FIG. 2 is a schematic view illustrating the results of mechanical strength versus temperature of the heat-sealing layer of an aluminum battery packaging film at different speeds according to an embodiment of the disclosure.

Referring to FIG. 1 and FIG. 2, the aluminum battery packaging film 100 of this embodiment includes a heat-sealing layer 110. The aluminum battery packaging film 100 of this embodiment makes the heat-sealing layer 110 by selecting materials such as modified polyethylene terephthalate (PET), polycarbonate (PC), polyimide (PI), or a combination thereof, which have corrosion-resistant characteristics. In this way, the problem of electrolyte corrosion of the heat-sealing layer 110 of aluminum battery packaging film 100 is improved, and the occurrence of breakage and leakage of aluminum battery is reduced, thereby enhancing the safety and lifetime of aluminum batteries. Furthermore, the aluminum battery packaging film 100 of this embodiment makes the heat-sealing layer 110 by selecting materials such as modified polyethylene terephthalate, polycarbonate, polyimide, or a combination thereof, which have corrosion-resistant characteristics. Therefore, the aluminum battery packaging film 100 of this embodiment has better corrosion-resistance, barrier performance, and heat-sealing performance. The aluminum battery packaging film 100 of this embodiment may be used in the process of rapid charge and discharge and high cycle times, it may withstand long-term contact with electrolyte without breakage and leakage, thereby enhancing the safety and lifetime of aluminum batteries.

In some embodiments, the heat-sealing performance of the crystalline form polyethylene terephthalate is poor, and the heat-sealing performance of the non-crystalline form polyethylene terephthalate is better. However, the crystalline form polyethylene terephthalate has the function of oxygen and vapor barrier. Therefore, the modified polyethylene terephthalate of this embodiment is formed by modifying a crystalline form and a non-crystalline form by co-extrusion, so that the aluminum battery packaging film 100 of this embodiment may has both heat-sealing and gas barrier functions. The crystalline form polyethylene terephthalate may be in the outer structure and the non-crystalline form polyethylene terephthalate may be in the inner structure, but the disclosure is not limited thereto. The modified polyethylene terephthalate may be formed by other suitable modification methods.

Furthermore, the polycarbonate and polyimide may be non-modified material or modified material. For example, polycarbonate may be modified with suitable long molecular chain compounds or high polarity functional groups, and polyimide may be modified by co-extrusion to make it heat-sealable, but the disclosure is not limited thereto.

In some embodiment, as shown in FIG. 2, the heat-sealing layer 110 may correspond to different mechanical strengths under different temperatures (200° C. to 240° C.) and speeds (3.8 m/min and 4 m/min). Therefore, a better range of mechanical strength may be obtained from FIG. 2. For example, the mechanical strength of the heat-sealing layer 110 may be at least 3 kilograms force (kgf). After one day of expansion test at this relatively strong mechanical strength, there is no problem of leakage of liquid, but the disclosure is not limited thereto. FIG. 2 shows an aluminum battery packaging film made by a heat-sealing layer made of modified polyethylene terephthalate. The expansion test is performed by filling the above aluminum cell packaging film with electrolyte and then vacuuming it to form a negative pressure (about -1 atmospheric pressure) to test whether or not it is able to withstand atmospheric pressure changes. Furthermore, the above electrolyte may be an acid electrolyte, so the aluminum battery packaging film 100 of the embodiment may be configured to package the aluminum battery including acid electrolyte, but the disclosure is not limited thereto.

It should be noted that the disclosure does not limit the types and specifications (e.g., anode, cathode, separator, electrolyte, etc.) of the aluminum battery to be coated by the aluminum battery packaging film 100. The types and specifications of the aluminum battery should be obtained by persons skilled in the art according to any content included in the spirit and scope of the appended claims.

In some embodiments, the thickness of the heat-sealing layer 110 is 25 micrometers (μm) to 150 micrometers, but the disclosure is not limited thereto. The thickness of the heat-sealing layer 110 may be adjusted according to the actual design requirements.

In some embodiments, due to the poor corrosion-resistance of the polypropylene, the material of the heat-sealing layer 110 of this embodiment does not include polypropylene. In other words, regarding the material of the heat-sealing layer 110 of this embodiment, the polypropylene with poor corrosion-resistance may be replaced by materials such as modified polyethylene terephthalate, polycarbonate, polyimide, etc., so as to enhance the corrosion-resistance, barrier performance, and heat-sealing performance of the aluminum battery packaging film 100, but the disclosure is not limited thereto.

In some embodiments, a first adhesive layer 120, a metal layer 130, a second adhesive layer 140, and a polymer material layer 150 are stacked on the heat-sealing layer 110 in sequence. The material of the first adhesive layer 120 and the second adhesive layer 140 may be polyurethane (PU), the material of the metal layer 130 may be aluminum, and the material of the polymer material layer 150 may be nylon or polyethylene terephthalate. In addition, the thickness of the first adhesive layer 120 is 1 micrometer to 10 micrometers. The thickness of the metal layer 130 is 20 micrometers to 60 micrometers. The thickness of the second adhesive layer 140 is 1 micrometer to 10 micrometers. The thickness of the polymer material layer 150 is 10 micrometers to 40 micrometers, but the disclosure is not limited thereto. The material and thickness of the first adhesive layer 120, the metal layer 130, the second adhesive layer 140, and the polymer material layer 150 may be adjusted according to the actual design requirements.

Aluminum battery packaging films made by heat-sealing layers made of different materials were cut into the size of 1 cm by 5 cm and placed in acid electrolytic, and then they were placed at normal temperature and in an oven at 80° C. respectively for an aging test. The results are shown in Table 1, and the following conclusions were obtained: when compared to polypropylene as the material of the heat-sealing layer, the corrosion resistance is better when the material of the heat-sealing layer is modified polyethylene terephthalate, polycarbonate, or polyimide.

TABLE 1

| Material of heat-sealing layer | Normal temperature | 80° C. |
|---|---|---|
| Modified polyethylene terephthalate | No corrosion for 120 days or more | 60 days (corroded) |
| Polycarbonate | No corrosion for 120 days or more | 40 days (corroded) |
| Polyimide | No corrosion for 30 days or more | No corrosion for 30 days or more |
| Polypropylene | Dissolve within 5 days | Dissolve within 3 days |

To sum up, the aluminum battery packaging film of the disclosure makes the heat-sealing layer by selecting materials such as modified polyethylene terephthalate, polycarbonate, polyimide, or a combination thereof, which have corrosion-resistant characteristics. Therefore, the aluminum battery packaging film of the disclosure has better corrosion-resistance, barrier performance, and heat-sealing performance. The aluminum battery packaging film of the disclosure may be used in the process of rapid charge and discharge and high cycle times, it may withstand long-term contact with electrolyte without breakage and leakage, thereby enhancing the safety and lifetime of aluminum batteries.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An aluminum battery packaging film, comprising:
a heat-sealing layer, wherein a material of the heat-sealing layer comprises modified polyethylene terephthalate, polycarbonate, or a combination thereof, and the modified polyethylene terephthalate is formed by modifying a crystalline form and a non-crystalline form by co-extrusion.

2. The aluminum battery packaging film according to claim 1, wherein a mechanical strength of the heat-sealing layer is at least greater than 3 kilogram force.

3. The aluminum battery packaging film according to claim 1, wherein a thickness of the heat-sealing layer is 25 micrometers to 150 micrometers.

4. The aluminum battery packaging film according to claim 1, wherein the aluminum battery packaging film is configured to package an aluminum battery comprising an acid electrolyte.

5. The aluminum battery packaging film according to claim 1, wherein the material of the heat-sealing layer does not comprise polypropylene.

6. The aluminum battery packaging film according to claim 1, wherein a first adhesive layer, a metal layer, a second adhesive layer, and a polymer material layer are stacked on the heat-sealing layer in sequence.

7. The aluminum battery packaging film according to claim 6, wherein a material of the metal layer is aluminum, and a material of the polymer material layer is nylon or polyethylene terephthalate.

8. The aluminum battery packaging film according to claim 6, wherein a thickness of the polymer material layer is 10 micrometers to 40 micrometers.

9. The aluminum battery packaging film according to claim 6, wherein a thickness of the metal layer is 20 micrometers to 60 micrometers.

* * * * *